United States Patent
Schick et al.

(10) Patent No.: US 10,821,664 B2
(45) Date of Patent: Nov. 3, 2020

(54) NOZZLE FOR ADDITIVE MANUFACTURING MACHINE

(71) Applicant: General Electric Company, Schenectady, NY (US)

(72) Inventors: David Edward Schick, Greenville, SC (US); Srikanth Chandrudu Kottilingam, Greenville, SC (US); Steven John Barnell, Pelzer, SC (US)

(73) Assignee: General Electric Company, Schenectady, NY (US)

( * ) Notice: Subject to any disclaimer, the term of this patent is extended or adjusted under 35 U.S.C. 154(b) by 568 days.

(21) Appl. No.: 15/672,729

(22) Filed: Aug. 9, 2017

(65) Prior Publication Data

US 2019/0047217 A1  Feb. 14, 2019

(51) Int. Cl.
| | | |
|---|---|---|
| *B29C 64/371* | (2017.01) | |
| *B29C 64/364* | (2017.01) | |
| *B33Y 30/00* | (2015.01) | |
| *B29C 64/245* | (2017.01) | |
| *B28B 1/00* | (2006.01) | |
| *B22F 3/105* | (2006.01) | |
| *B29C 64/209* | (2017.01) | |
| *B29C 64/268* | (2017.01) | |
| *B29K 105/00* | (2006.01) | |

(52) U.S. Cl.
CPC .......... *B29C 64/209* (2017.08); *B28B 1/001* (2013.01); *B29C 64/245* (2017.08); *B29C 64/364* (2017.08); *B29C 64/371* (2017.08); *B33Y 30/00* (2014.12); *B22F 3/1055* (2013.01); *B22F 2003/1056* (2013.01); *B29C 64/268* (2017.08); *B29K 2105/251* (2013.01)

(58) Field of Classification Search
CPC .......... B22F 3/1055; B22F 2003/1056; B22F 2003/1057; B22F 2003/1058; B22F 2003/1059; B29C 64/209; B29C 64/364; B29C 64/371; B33Y 30/00
See application file for complete search history.

(56) References Cited

U.S. PATENT DOCUMENTS

| | | |
|---|---|---|
| 2011/0168092 A1 | 7/2011 | Clark et al. |
| 2013/0068161 A1* | 3/2013 | White ............... C23C 16/45578 118/723 R |
| 2015/0174823 A1 | 6/2015 | Wiesner et al. |
| 2016/0136731 A1 | 5/2016 | McMurtry et al. |
| 2017/0087635 A1 | 3/2017 | Wilkes et al. |
| 2017/0144223 A1 | 5/2017 | Gold et al. |
| 2018/0126460 A1* | 5/2018 | Murphree ............... B29C 64/35 |

FOREIGN PATENT DOCUMENTS

WO  2015189619 A1  12/2015

OTHER PUBLICATIONS

International Search Report issued in connection with corresponding PCT Application No. US/2018/044977 dated Dec. 18, 2018, 3 pages.

* cited by examiner

*Primary Examiner* — Philip C Tucker
*Assistant Examiner* — Jimmy R Smith, Jr.
(74) *Attorney, Agent, or Firm* — James Pemrick; Hoffman Warnick LLC

(57) ABSTRACT

A nozzle has a main body having an input side and an output side, a central region and two opposing end regions. A plurality of linearly arranged apertures extend from the input side to the output side, and each of the apertures has a respective opening. At least one opening in the central region is smaller than at least one opening in the end regions.

13 Claims, 5 Drawing Sheets

NOZZLE FOR ADDITIVE MANUFACTURING MACHINE

BACKGROUND OF THE INVENTION

The present technology relates generally to a nozzle, and more particularly to a nozzle for an additive manufacturing machine.

Additive manufacturing is a technology that enables the "3D-printing" of components of various materials including metals, ceramics and plastics. In additive manufacturing, a part is built in a layer-by-layer manner by leveling metal powder and selectively fusing the powder within a layer using a high-power laser or electron beam. After each layer, more powder is added and the laser patterns the next layer, simultaneously fusing it to the prior layers to fabricate a complete component buried in a powder bed. Additive manufacturing machines are used to fabricate precision three-dimensional components from a digital model.

In making a build in current powder bed systems, a laser beam or electron beam is used to scan a layer of powder to sinter and melt the desired pattern in the layers of the powder bed. When the laser melts (or welds) the powder, combustion byproducts are created. Particulate matter (smoke, unfused or partially fused powder, or particles) may be emitted into the region above the build platform. This particulate matter can interfere with the laser, as dense regions of the particulate matter can block, deflect, reduce resolution of, or otherwise interfere with the laser. To overcome this problem, process gas is used to carry the particulate matter away from the build platform and subsequently out of the build chamber. Typically, inert gas (e.g., argon or nitrogen) is input through a nozzle (also sometimes referred to as a diffuser) on one side of the build platform, the gas (and the particulate matter) passes over the build platform and is removed at an opposing side of the build platform and the particulate matter is captured in a filter. In this manner, the gas sweeps the particulate matter away from the build platform. However, the gas does not move in a laminar flow so some regions of the build platform receive higher velocity gas and others receive lower velocity gas. These non-laminar flow streams create turbulent regions that prevent timely and efficient removal of the particulate matter, and also result in poor welding, including increased porosity that can lead to parts that are not water-tight (i.e., porous). In addition, the non-laminar flow streams create undesirable variations in surface finish of the additively manufactured parts.

BRIEF DESCRIPTION OF THE INVENTION

In an aspect of the present disclosure, a nozzle has a main body having an input side and an output side, a central region and two opposing end regions. A plurality of linearly arranged apertures extend from the input side to the output side, and each of the apertures has a respective opening. At least one opening in the central region is smaller than at least one opening in the end regions.

In another aspect of the present disclosure, a nozzle for an additive manufacturing machine is provided. The nozzle has a main body having an input side and an output side, and a central region and two opposing end regions. A plurality of linearly arranged apertures extend from the input side to the output side, and each of the apertures has a respective opening. At least one opening in the central region is smaller than at least one opening in the end regions.

In yet another aspect of the present disclosure, an additive manufacturing machine includes a laser source to generate a laser beam, a build platform, a source of powder and a recoater for distributing the powder over the build platform. A nozzle directs an inert gas over the build platform. The nozzle has a main body having an input side and an output side, a central region and two opposing end regions. Each end region is located adjacent to the central region. A plurality of linearly arranged apertures extend from the input side to the output side along both the central region and both end regions, and each of the apertures has a respective opening. At least one opening in the central region is smaller than at least one opening in the end region.

DETAILED DESCRIPTION OF THE INVENTION

One or more specific aspects/embodiments of the present invention will be described below. In an effort to provide a concise description of these aspects/embodiments, all features of an actual implementation may not be described in the specification. It should be appreciated that in the development of any such actual implementation, as in any engineering or design project, numerous implementation-specific decisions must be made to achieve the developers' specific goals, such as compliance with machine-related, system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," and "the" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "one aspect" or "an embodiment" or "an aspect" of the present invention are not intended to be interpreted as excluding the existence of additional embodiments or aspects that also incorporate the recited features.

The phrase "additive manufacturing machine" is used interchangeably herein with the phrase "printing apparatus" and term "printer", and the term "print" is used interchangeably herein with the word "build", referring to the action for building a structure by an additive manufacturing machine, regardless of the particular additive manufacturing technology being used to form the structure. As used herein, print and printing refer to the various forms of additive manufacturing and include three-dimensional (3D) printing or 3D rapid prototyping, as well as sintering or melting/fusing technologies. Non-limiting examples of additive manufacturing or printing techniques include powder bed fusion, fused deposition modeling, electron beam melting (EBM), laminated object manufacturing, selective laser sintering (SLS), direct metal laser sintering (DMLS), direct metal laser melting (DMLM), selective laser melting (SLM), and stereolithography (SLA), among others.

Figure 1:
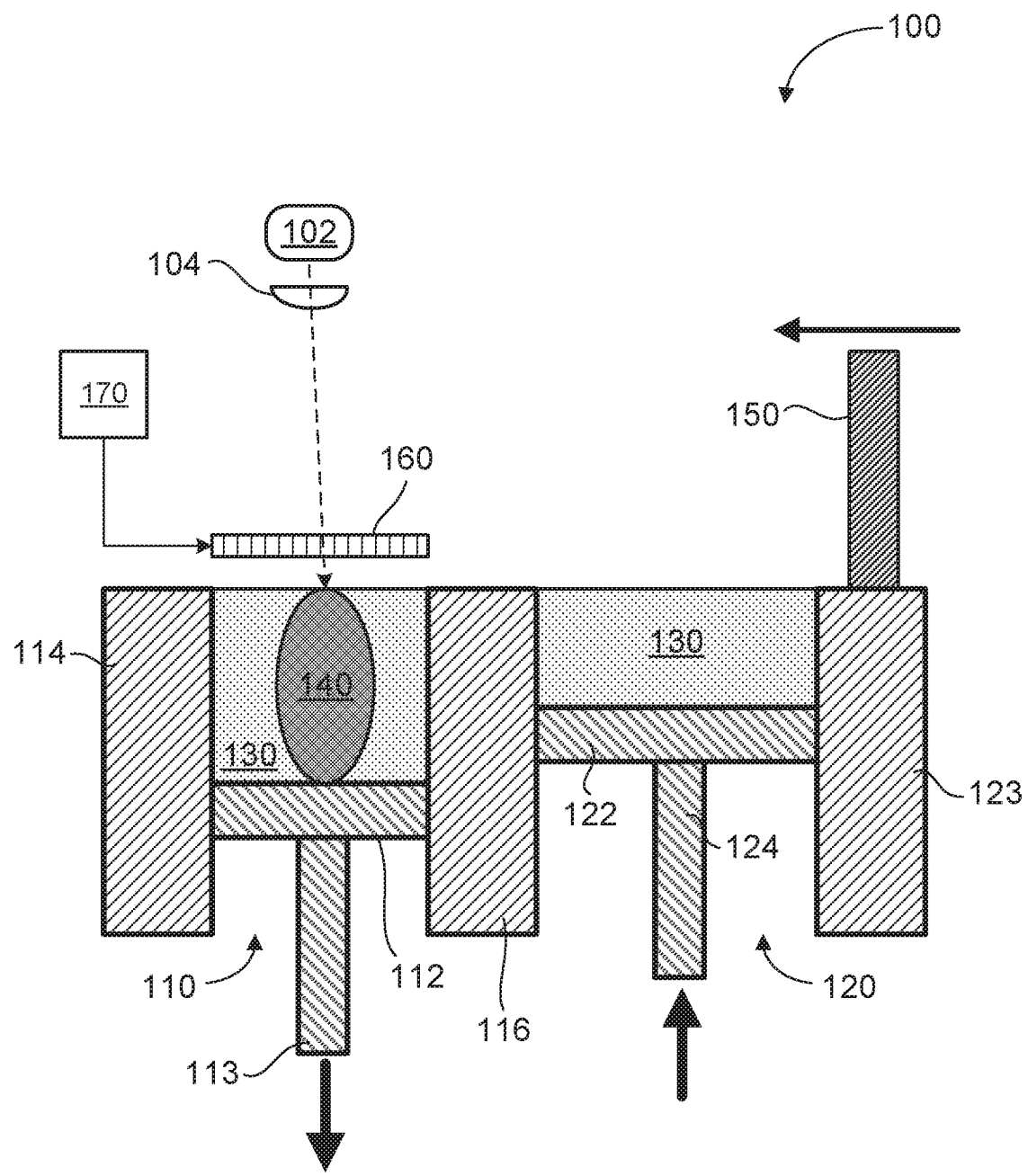
FIG. 1 illustrates a cross-sectional view of an additive manufacturing apparatus, in accordance with aspects described herein.

FIG. 1 depicts one example of an additive manufacturing machine 100, in accordance with aspects described herein. As is seen in FIG. 1, additive manufacturing machine 100 is a powder bed fusion type of 3D printing device that includes a laser source 102 and lens/mirror 104. A build section 110 is located adjacent to a dispensing section 120. The build section includes the build platform 112, onto which the part 140 (e.g., the 3D printed part or structure) is built. The build platform is connected to a shaft or support 113 that lowers the build platform in increments as the part 140 is built. At the start of 3D printing, the build platform will be at a high position, and as each layer of the part 140 is formed the build platform will lower accordingly. The build platform 112 or build section 110 is enclosed on the sides by walls 114 and 116 (additional walls may be used, but are not shown).

The dispensing section 120 contains a supply/source of powder 130 supported by dispensing platform 122 and contained by walls 116 and 123. The dispensing platform 122 is raised up by shaft or support 124. When a new layer of powder is required in build section 110, the dispensing platform 122 will raise up by a predetermined amount so that the recoater 150 can push the powder 130 from section 120 over to section 110. In this manner, a new layer of powder is spread over part 140 so that the laser 102 may fuse the next layer of the part 140. The recoater 150 will then return to its position above wall 123, and be ready for the next layer. Alternatively, the powder supply may be stored in the back of the machine above the build area/platform in a hopper. In this example, the powder drops down into a recoater that then drops it onto the build platform where a wiper levels the powder. Additionally, the recoater may be configured to go from back to front (and vice-versa) in the machine.

The machine 100 also includes a nozzle 160 (sometimes also referred to as a diffuser) that directs an inert gas flow over the upper surface (i.e., the top layer of part 140) of the build platform. A gas supply 170 supplies the gas, which is typically and inert gas, such as argon or nitrogen. Other inert gases may also be used, as desired in the specific application. The gas flows out of the page in FIG. 1. The problem with previously used nozzles is that the gas flow is not laminar across the build surface, and this non-laminar flow creates turbulence that interferes with the removal of welding byproducts. Smoke and other particles can be swirled by the turbulence and recirculated back into the laser beam. Part resolution and quality is decreased when the laser is interfered with by smoke or other airborne particles. The nozzle 160 may be configured to flow process gas across the build platform from right to left, left to right, back to front or front to back.

Figure 2:
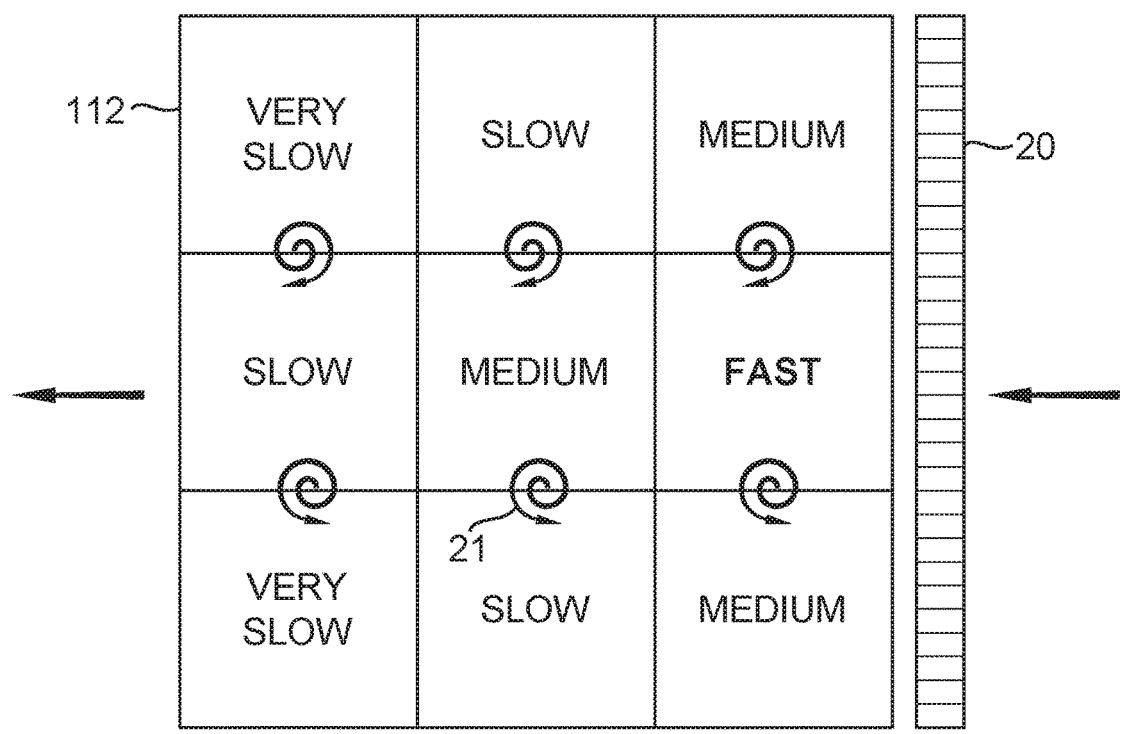
FIG. 2 illustrates a top, schematic view of the build platform and various sections of the build platform experiencing different velocities of gas flow due to characteristics of a known gas nozzle.

FIG. 2 illustrates a top, schematic view of the build platform and various sections of the build platform experiencing different velocities of gas flow. This is a typical gas flow with a known gas nozzle 20 having one large opening or a plurality of openings with all the same cross-sectional area. The nozzle 20 is placed on the right side of the build platform 112 and gas flows from right to left. The center-right (or middle-right from a machine perspective) portion of the build platform experiences high velocity (or fast) gas flow. The upper-right (or back-right), lower-right (or front-right) and center portions of the build platform experience medium velocity gas flow. The upper-center (or back-center), lower-center (or front-center) and center-left portions of the build platform experience slow velocity gas flow. The upper-left (or back left) and lower-left (or front-left) portions of the build platform experience very slow velocity gas flow. As a non-limiting example only, high velocity gas (fast) flow may be about 1 meter per second (m/s) or faster, medium velocity gas flow may be about 0.85 m/s to 0.95 m/s, slow velocity gas flow may be about 0.7 m/s to 0.8 m/s, and very slow velocity gas flow may be less than 0.7 m/s.

The interfaces between the different non-laminar velocity zones (e.g., fast-medium, slow-medium, etc.) create turbulences 21 and vortexes that swirl the particulate emissions and increase the possibility that the particulate matter will interfere with the laser. It is believed that this non-laminar flow is caused by the equally spaced and sized openings of the nozzle 20, and that gas flow is higher in the center of the nozzle and slower at the ends of the nozzle.

Figure 3:
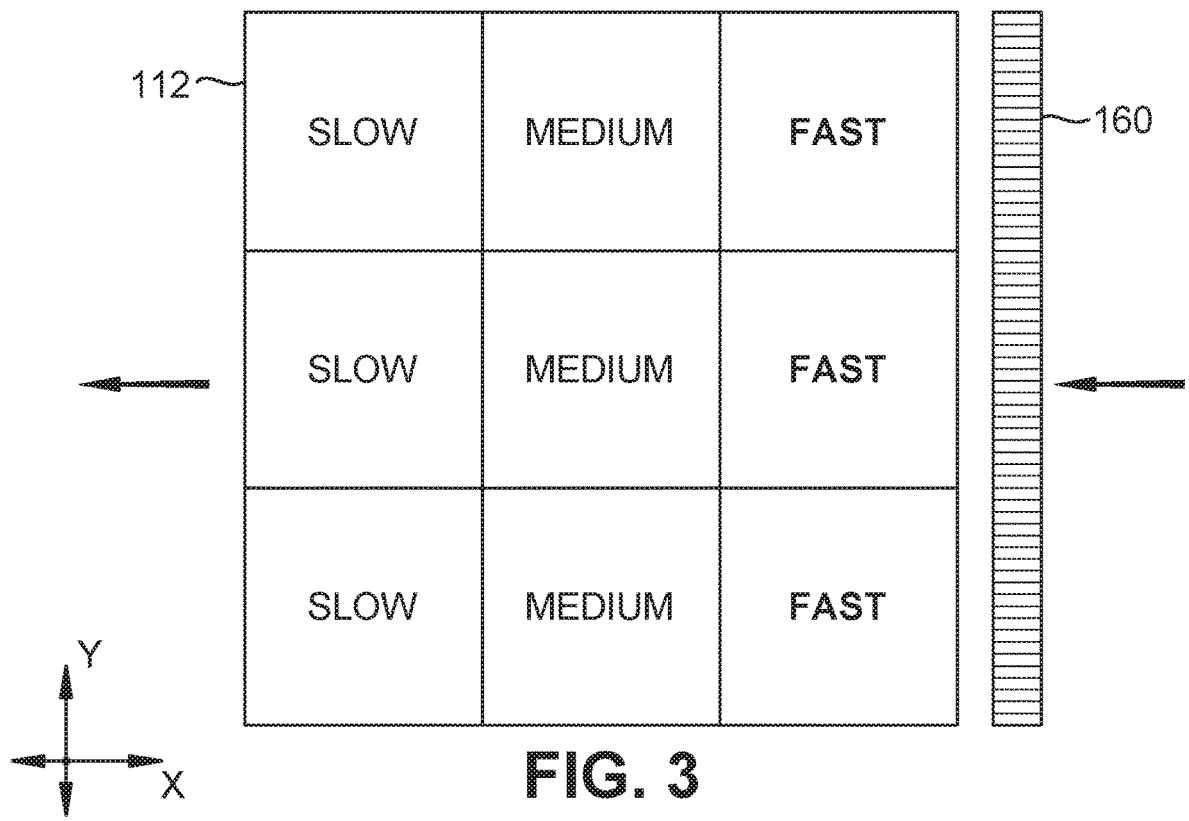
FIG. 3 illustrates a top, schematic view of the build platform and various sections of the build platform experiencing laminar gas flow, in accordance with aspects described herein.

FIG. 3 illustrates a top, schematic view of the build platform 112 and various sections of the build platform experiencing substantially laminar gas flow, in accordance with aspects described herein. The nozzle 160 has a plurality of linearly arranged apertures with varying opening sizes. Apertures in the center or central region of the nozzle have smaller openings than apertures located in the end regions of the nozzle. This configuration of varying restriction (i.e., varying opening size for each aperture) in the gas flow from the nozzle evens out the velocity across the entire length of the nozzle. Nozzle 160 results in fast gas flow across the entire right side of the build platform, medium flow across the entire center portions of the build platform and slow gas flow across the entire left side of the build platform. The right, center and left portions of the build platform now have a laminar gas flow stream that eliminates (or at least greatly reduces) any turbulences or vortexes. The gas flow does reduce in speed as it gets farther away from the nozzle exit due to frictional losses as well as expanding gas thermodynamics, but the gas flow velocity is substantially constant for a given distance X from the nozzle 160 at multiple Y locations.

Figure 4:
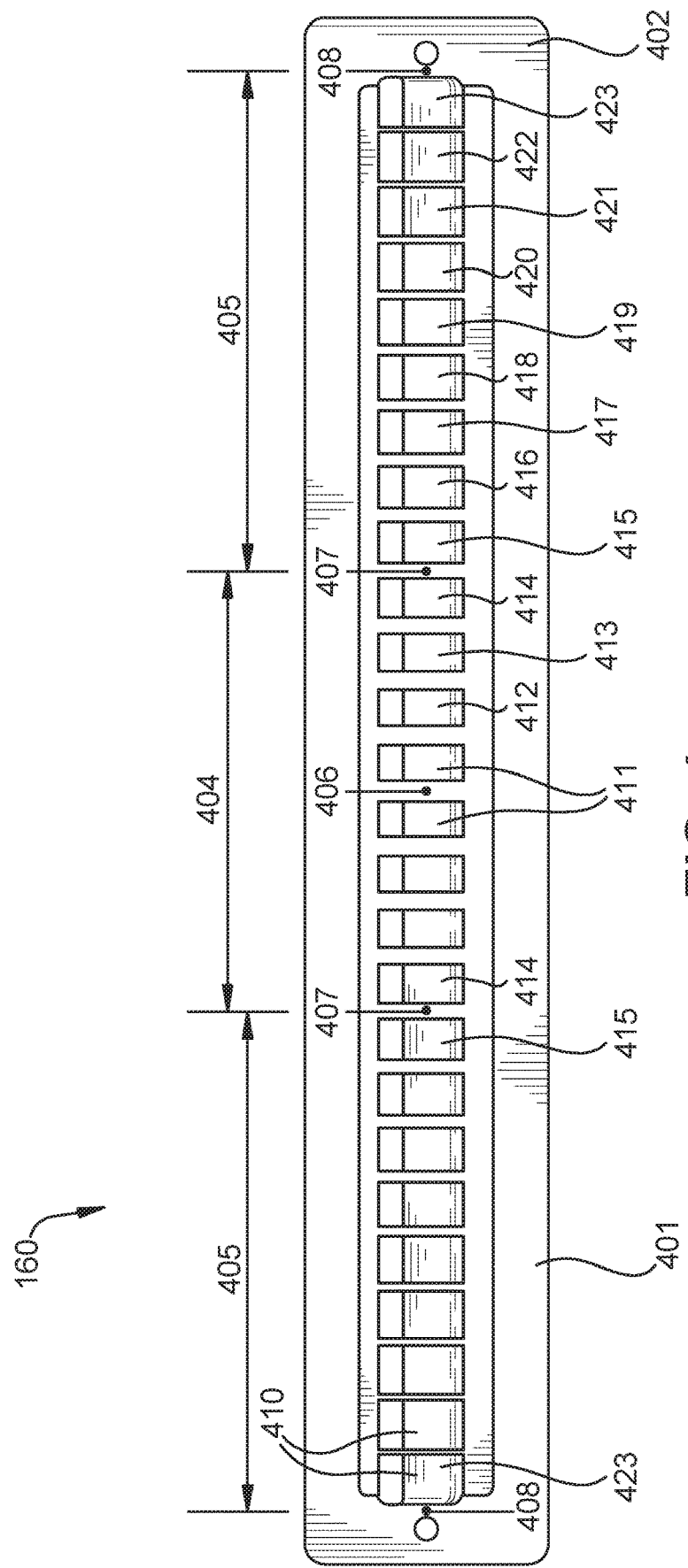
FIG. 4 illustrates a back view of the nozzle, in accordance with aspects described herein.

FIG. 4 illustrates a back view of the nozzle 160, in accordance with aspects described herein. The nozzle 160 includes a main body 401 having an input side 402 and an output side 403 (not shown in FIG. 4). The main body 401 is comprised of a central region 404 and two opposing end regions 405. A plurality of linearly arranged apertures 410 extend from the input side 402 to the output side 403, and each of the apertures have a respective opening. The openings in the central region 404 are smaller than the openings in the end regions 405. The nozzle 160 has a center point 406 located at the center of the linearly arranged apertures. The apertures and openings are symmetrical with respect to this center point 406, which means that the openings in the right side/half of the nozzle are a mirror image to the openings in the left side/half of the nozzle. With respect to the right side/half, the first opening 411 has the smallest relative opening size when compared to other openings in the right side. The opening size of each aperture increases in size as they approach the outer end of the end region. Opening 423 has the largest relative size of all openings in the right half. The intervening nozzles 412 to 422 have openings that get increasingly larger as they approach the outer end of the end region (or opening 423).

The central region 404 has the center point 406 and a central end point 407, which marks the end of the central region. The central end point 407 is co-located with the inner end point 407 of the end region 405. The end region has an outer end point 408 at the outer end of the linear array of apertures. For ease of explanation, it will be assumed that opening 423 has a relative opening area of 100%. Openings 411, 412, 413 and 414 are contained within the central region and each of these openings have a relative opening area ranging between about 60% to about 80%. The openings located at or adjacent to central point 406 may have a relative opening area of about 60% to 65%. As one non-limiting example, opening 411 may have a relative opening area of about 63%, opening 412 an area about 68%, opening 413 an area about 72% and opening 414 an area about 76%. The central region openings 411-414 may vary in size by about 5% to about 7% from a neighboring opening, where the openings get progressively larger the farther they are from central point 406.

The end region openings 415-423 are contained within end region 405 and each of these openings have a relative opening area ranging between about 80% to 100%. As one non-limiting example, opening 415 may have a relative opening area of about 80%, opening 416 an area about 83%, opening 417 an area about 86%, opening 418 an area about 88%, opening 419 an area about 91%, opening 420 an area about 94%, opening 421 an area about 96%, opening 422 an area about 99% and opening 423 an area of 100%. The end region openings 415-423 may vary in size by about 1% to about 3% from a neighboring opening, where the openings get progressively larger the farther they are from central point 406. It is to be understood that more or less openings could be employed in nozzle 160, as may be required in the specific application, and the specific number of apertures described above are only one example to aid in explaining the aspects described herein. The opening sizes may be obtained by restrictor plates placed in front of the walls between apertures, by restrictors orifices placed within apertures 410 or by restrictor plates placed on output side 403. The walls between apertures 410 may also be tapered to create the various opening sizes, for example the wall between apertures 411 and 412 would have a thick wedge profile when compared to the wall between apertures 422 and 423, which would have a relatively thinner wedge profile. The apertures in the left half (those apertures to the left of central point 406) will have the same configuration as the apertures in the right half, albeit in a mirrored configuration.

Figure 5:
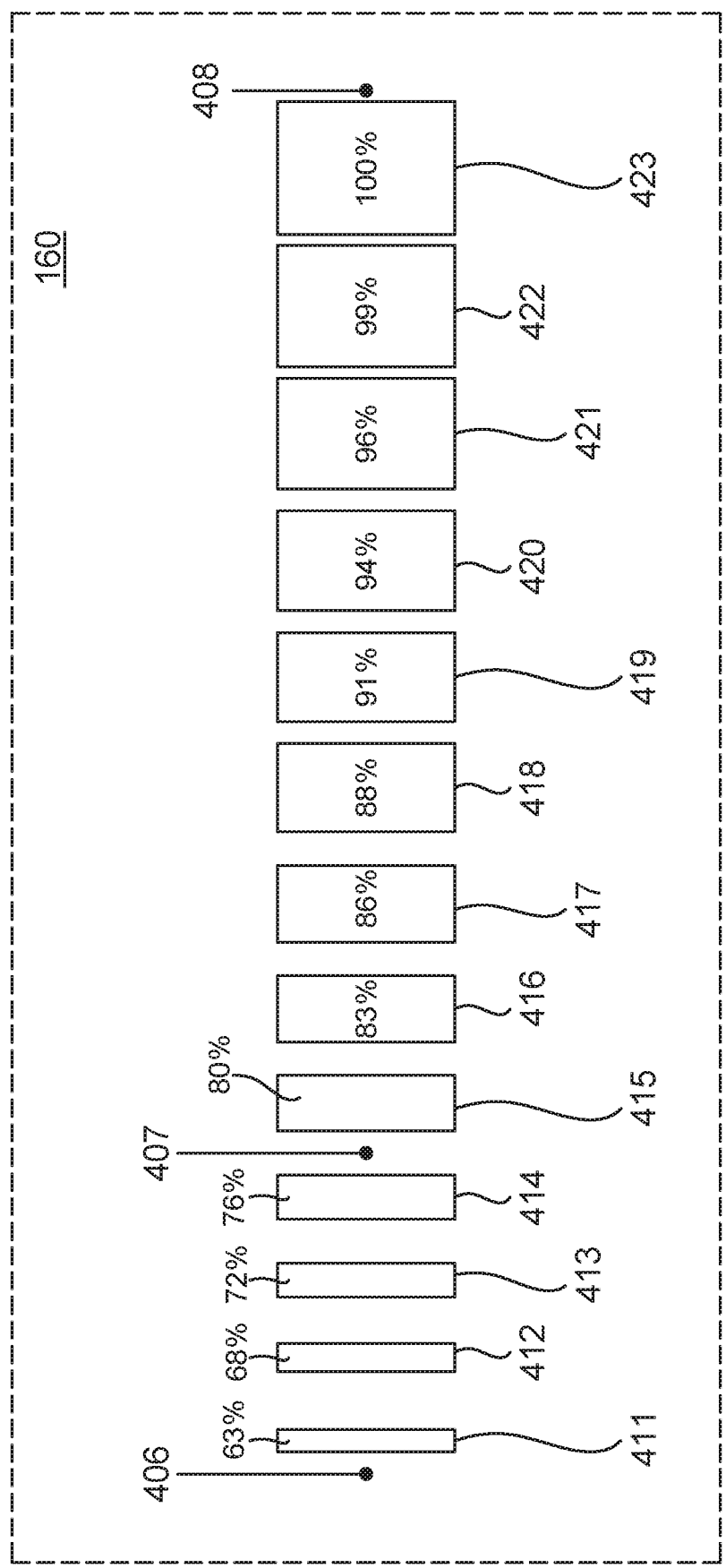
FIG. 5 illustrates a schematic representation of one half of the apertures and openings in the nozzle, in accordance with aspects described herein.

FIG. 5 illustrates a schematic representation of one half of the apertures and openings in the nozzle. Opening 411 is the smallest of all the remaining openings 412-423. Opening 423 is the largest opening of the remaining openings 411-422. As one non-limiting example only, if opening 423 had an opening area equal to 150 mm$^2$, then opening 411 would have an opening area equal to 94.5 mm$^2$. Opening 412 is larger than opening 411, and opening 412 may have a 102 mm$^2$ opening, in this example. Opening 413 is larger than opening 412, and opening 413 may have a 108 mm$^2$ opening, in this example. Opening 414 is larger than opening 413, and opening 414 may have a 114 mm$^2$ opening, in this example. Following the preceding trend example, the subsequent openings have the following square area values, 415—120 mm$^2$, 416—124.5 mm$^2$, 417—129 mm$^2$, 418—132 mm$^2$, 419—136.5 mm$^2$, 420—141 mm$^2$, 421—144 mm$^2$, and 422—148.5 mm$^2$. The distance between neighboring openings also increases as distance from center point 406 increases. For example, the distance between openings 411 and 412 is larger than the distance between openings 422 and 423.

Figure 6:
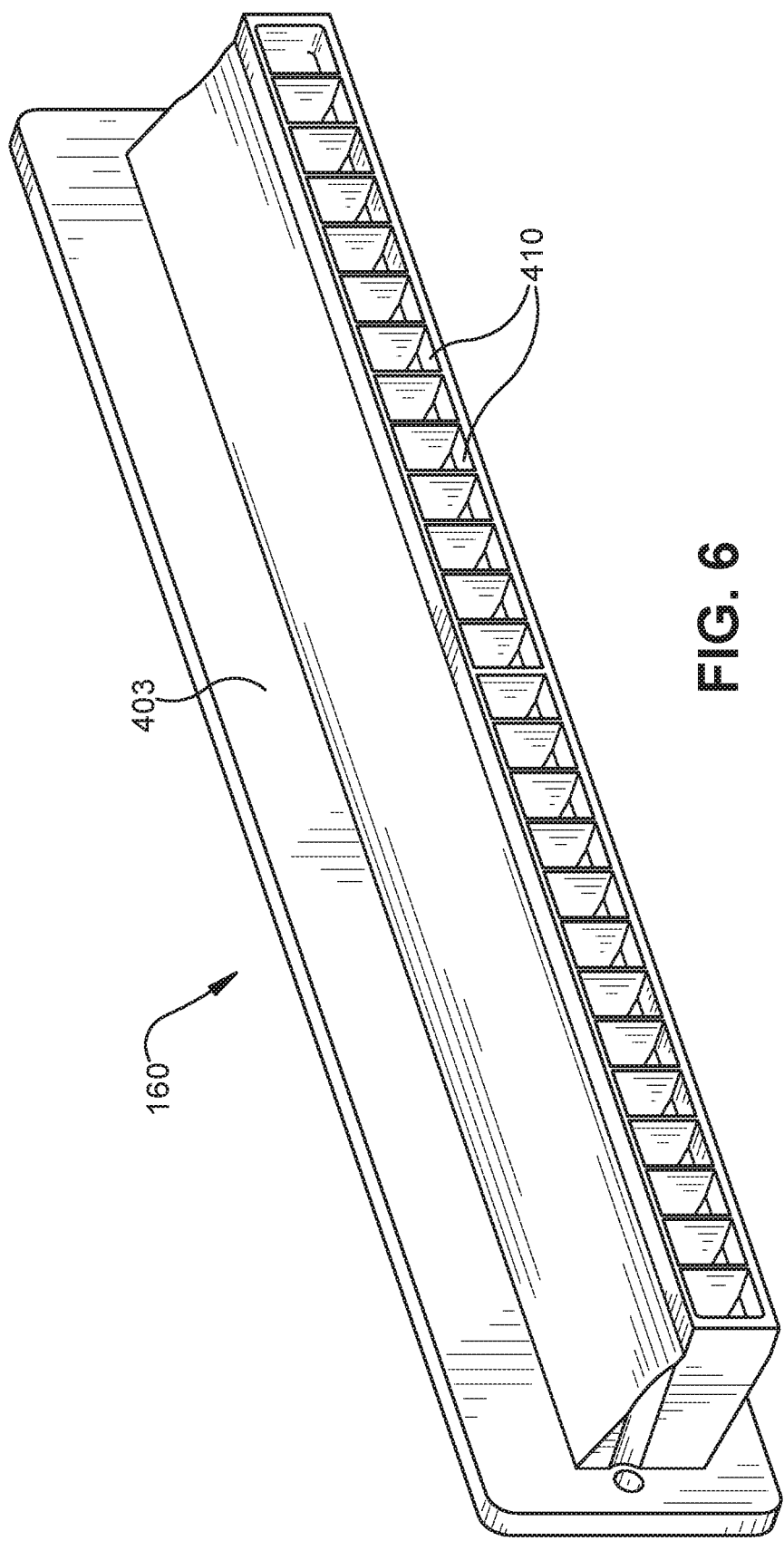
FIG. 6 illustrates a front, isometric view of the nozzle, in accordance with aspects described herein.

FIG. 6 illustrates a front, isometric view of the nozzle 160, in accordance with aspects described herein. The output side or front side 403 faces the build chamber/platform of the additive manufacturing machine. The linearly arranged apertures 410 extend across the nozzle and have respective passageways connecting the input side to the output side. The gas flows through these passageways. In this example, the output/front side 403 of the apertures 410 is not restricted and all apertures have approximately the same front side opening area. However, the input side opening area is restricted so flow rates will be throttled to yield a substantially even output flow out of the front side 403 of the nozzle 160. The restricted orifice/opening for each aperture 410 may occur at the input side of the aperture, somewhere along the passageway of each aperture, or at the output side of the aperture. The important point is that each aperture has an opening area of a specified area designed to equally distribute flow at the output side of the nozzle, so that a laminar gas flow is achieved across the build platform or additive manufactured part(s). The variable opening sizes feature of the nozzle is specifically to achieve substantially laminar gas flow across the build area, and the improved laminar flow prevents local eddies or currents in the gas flow that can trap particulates.

Approximating language, as used herein throughout the specification and claims, may be applied to modify any quantitative representation that could permissibly vary without resulting in a change in the basic function to which it is related. Accordingly, a value modified by a term or terms, such as "about," "approximately" and "substantially," are not to be limited to the precise value specified. "Substantially" is defined as, of ample or considerable amount, quantity, size, etc. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise. The terms "about" and "approximately" as applied to a particular value of a range applies to both values, and unless otherwise dependent on the precision of the instrument measuring the value, may indicate +/−10% of the stated value(s). The term "about" may also be defined as "near or close to", and includes the tolerance value of +/−10%.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A nozzle comprising:
   a main body having an input side and an output side, a central region and two opposing end regions;
   a plurality of linearly arranged apertures, the apertures extending from the input side to the output side, each of the apertures having a respective opening;
   wherein at least one opening in the central region is smaller than at least one opening in the end regions;
   the central region having a center point and a respective central end point co-located with a beginning of each end region, each end region having an inner end point co-located with a respective central end point, and each end region further having a respective outer end point;
   for each end region, an outermost opening located closest to the respective outer end point and having a relative opening area defined as 100%;
   openings located in the central region each having a respective relative opening area of between about 60% to about 80% of those of the outermost openings;
   an opening located closest to the center point having a respective opening area of about 60% to 65% of those of the outermost openings; and
   the openings located in the central region each varying in size by about 5% to about 7% from that of a respective directly adjacent opening.

2. The nozzle of claim 1, wherein the openings of the apertures increase in size as the openings become more distant from the center point.

3. The nozzle of claim 1, the openings located in the end regions each having a relative opening area of between about 80% to 100% of those of the outermost openings.

4. The nozzle of claim 3, the openings located in the end regions each varying in size by about 1% to about 3% from that of a respective directly adjacent opening.

5. A nozzle for an additive manufacturing machine, the nozzle comprising:
   a main body having an input side and an output side, a central region and two opposing end regions;
   a plurality of linearly arranged apertures, the apertures extending from the input side to the output side, each of the apertures having a respective opening;
   wherein at least one opening in the central region is smaller than at least one opening in the end regions;
   the central region having a center point, and a respective central end point co-located with an inner end point of each of the end regions, each end region having an outer end point opposed to the inner end point;
   for each end region, an outermost opening located closest to the respective outer end point and having a relative opening area defined as 100%;
   openings located in the central region each having a relative opening area of between about 60% to about 80% of those of the outermost openings; and
   an opening located closest to the center point having a respective opening area of about 60% to 65% of those of the outermost openings; and
   the openings located in the central region each varying in size by about 5% to about 7% from that of a respective directly adjacent opening.

6. The nozzle of claim 5, the apertures linearly extending from the center point to the outer end point of each end region, wherein the openings of the apertures increase in size as the openings become more distant from the center point.

7. The nozzle of claim 5, the openings located in the end regions each having a relative opening area of between about 80% to 100% of those of the outermost openings.

8. The nozzle of claim 7, the openings located in the end regions each varying in size by about 1% to about 3% from that of a directly adjacent opening.

9. An additive manufacturing machine comprising:
   a laser source to generate a laser beam;
   a build platform;
   a source of powder and a recoater for distributing the powder over the build platform;
   a nozzle to direct an inert gas over the build platform, the nozzle comprising,
      a main body having an input side and an output side, a central region and two opposing end regions, each end region located adjacent to the central region;
      a plurality of linearly arranged apertures, the apertures extending from the input side to the output side along both the central region and both end regions, each of the apertures having a respective opening;
      wherein at least one opening in the central region is smaller than at least one opening in a respective one of the end regions;
      the central region having a center point and a respective central end point, the central end point co-located with an inner end point of each of the end regions, each end region having an outer end point opposed to the inner end point;
      for each end region, an outermost opening located closest to the respective outer end point and having a relative opening area defined as 100%;
      an opening located closest to the center point having a respective opening area of about 60% to 65% of those of the outermost openings;
      openings located in the end regions each having a relative opening area of between about 80% to 100% of those of the outermost openings; and
      the openings located in the end regions varying in size by about 1% to about 3% from that of a respective directly adjacent opening.

10. The additive manufacturing machine of claim 9, wherein openings in the central region are smaller than openings in the end regions.

11. The additive manufacturing machine of claim 9, the apertures linearly extending from the center point to the outer end point of each end region, wherein the openings of the apertures increase in size as the openings become more distant from the center point.

12. The additive manufacturing machine of claim 9, the openings located in the central region each having a relative opening area of between about 60% to about 80% of those of the outermost openings.

13. The additive manufacturing machine of claim 12, the openings located in the central region each varying in size by about 5% to about 7% from a respective directly adjacent opening.

* * * * *